(12) United States Patent
Barsness et al.

(10) Patent No.: US 8,381,220 B2
(45) Date of Patent: Feb. 19, 2013

(54) JOB SCHEDULING AND DISTRIBUTION ON A PARTITIONED COMPUTE TREE BASED ON JOB PRIORITY AND NETWORK UTILIZATION

(75) Inventors: Eric Lawrence Barsness, Pine Island, MN (US); David L. Darrington, Rochester, MN (US); Amanda Peters, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1229 days.

(21) Appl. No.: 11/930,611

(22) Filed: Oct. 31, 2007

(65) Prior Publication Data

US 2009/0113438 A1    Apr. 30, 2009

(51) Int. Cl.
*G06F 9/50* (2006.01)
*G06F 9/46* (2006.01)
*G06F 15/16* (2006.01)
*G06F 15/173* (2006.01)

(52) U.S. Cl. ......... 718/104; 718/100; 709/201; 709/226
(58) Field of Classification Search .................. None
See application file for complete search history.

(56) References Cited

U.S. PATENT DOCUMENTS

| | | | | |
|---|---|---|---|---|
| 6,687,257 B1* | 2/2004 | Balasubramanian | ......... | 370/429 |
| 2002/0078130 A1* | 6/2002 | Thornton et al. | ............ | 709/201 |
| 2002/0165754 A1* | 11/2002 | Tang et al. | ........................ | 705/9 |
| 2002/0174217 A1* | 11/2002 | Anderson | ..................... | 709/224 |
| 2003/0065810 A1* | 4/2003 | Ims et al. | ...................... | 709/232 |
| 2003/0237084 A1* | 12/2003 | Neiman et al. | ................. | 718/102 |
| 2004/0078493 A1* | 4/2004 | Blumrich et al. | ............. | 709/250 |
| 2004/0103218 A1* | 5/2004 | Blumrich et al. | ............. | 709/249 |
| 2004/0171386 A1* | 9/2004 | Mitjana | ...................... | 455/452.2 |
| 2004/0243769 A1* | 12/2004 | Frame et al. | ................... | 711/148 |
| 2005/0076137 A1* | 4/2005 | Tang et al. | .................... | 709/238 |
| 2005/0190692 A1* | 9/2005 | Singh et al. | .................... | 370/229 |

OTHER PUBLICATIONS

Moreira et al., Blue Gene/L programming and operating environment, IBM J. Res. & Dev. vol. 49 No. 2/3 (2005).*
Gara et al., Overview of the Blue Gene/L system architecture, IBM J. Res. & Dev. vol. 49 No. 2/3 (2005).*
Almasi et al., An Overview of the Blue Gene/L System Software Organization, Euro-Par 2003, LNCS 2790, pp. 543-555, 2003.*

* cited by examiner

*Primary Examiner* — Jennifer To
*Assistant Examiner* — Benjamin Wu
(74) *Attorney, Agent, or Firm* — Martin & Associates, LLC (57) ABSTRACT

A method and apparatus optimizes job and data distribution on a multi-node computing system. A job scheduler distributes jobs and data to compute nodes according to priority and other resource attributes to ensure the most critical work is done on the nodes that are quickest to access and with less possibility of node communication failure. In a tree network configuration, the job scheduler distributes critical jobs and data to compute nodes that are located closest to the I/O nodes. Other resource attributes include network utilization, constant data state, and class routing.

16 Claims, 5 Drawing Sheets

JOB SCHEDULING AND DISTRIBUTION ON A PARTITIONED COMPUTE TREE BASED ON JOB PRIORITY AND NETWORK UTILIZATION

BACKGROUND

1. Technical Field

The disclosure and claims herein generally relate to multi-node computer systems, and more specifically relate to optimization of job distribution on a multi-node computer system.

2. Background Art

Supercomputers and other multi-node computer systems continue to be developed to tackle sophisticated computing jobs. One type of multi-node computer system is a massively parallel computer system. A family of such massively parallel computers is being developed by International Business Machines Corporation (IBM) under the name Blue Gene. The Blue Gene/L system is a high density, scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

Computer systems such as Blue Gene have a large number of nodes, each with its own processor and local memory. The nodes are connected with several communication networks. One communication network connects the nodes in a logical tree network. In the logical tree network, the Nodes are connected to an input-output (I/O) node at the top of the tree. The remaining nodes are not connected to the I/O node. Communication from a node further down the tree introduces additional latency in the transfer of data from a data storage unit such as a hard disk drive over the network.

With the communication networks as described above, applications or "jobs" loaded on nodes further down the tree network will take longer to execute due to I/O latency in the tree network. This can be a problem for jobs that require significant amounts of I/O communication to execute. In addition, jobs executing further from the I/O node are more likely to suffer from a network failure since there are more network connections between the job and the data resource. Without a way to optimize job allocation on multiple nodes, parallel computer systems will continue to suffer from reduced efficiency of computer system.

BRIEF SUMMARY

An apparatus and method is described for job and data distribution on a multi-node computing system. A job scheduler distributes jobs and data to compute nodes according to priority and other resource attributes to ensure the most critical work is done on the nodes that are quickest to access and with less possibility of node communication failure. In a tree network configuration, the job scheduler distributes critical jobs and data to compute nodes that are located closest to the I/O nodes. Other resource attributes include network utilization, constant data state, and class routing.

The description and examples herein are directed to a massively parallel computer system such as the Blue Gene architecture, but the claims herein expressly extend to other parallel computer systems with multiple processors arranged in a network structure.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

The description and claims herein are directed to a method and apparatus for job and data distribution on a multi-node computing system. A job scheduler distributes jobs and data to compute nodes according to priority and other resource attributes to ensure the most critical work is done on the nodes that are quickest to access and with less possibility of node communication failure. In a tree network configuration, the job scheduler distributes critical jobs and data to compute nodes that are located closest to the I/O nodes. The examples herein will be described with respect to the Blue Gene/L massively parallel computer developed by International Business Machines Corporation (IBM).

Figure 1:
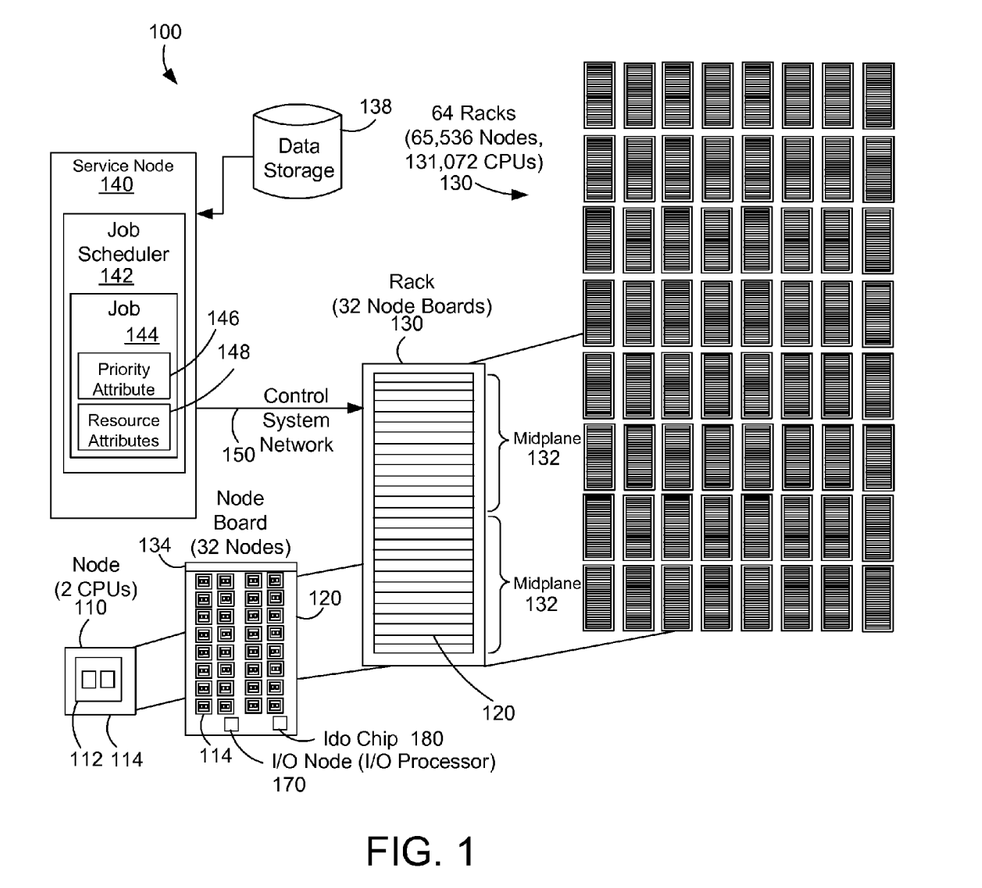
FIG. 1 is a block diagram of a massively parallel computer system.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards× 32 nodes×2 CPUs).

The Blue Gene/L computer system structure can be described as a compute node core with an I/O node surface, where communication to 1024 compute nodes 110 is handled by each I/O node 170 that has an I/O processor connected to the service node 140. The I/O nodes 170 have no local storage. The I/O nodes are connected to the compute nodes through the logical tree network and also have functional wide area network capabilities through a gigabit ethernet network (See FIG. 2 below). The gigabit Ethernet network is connected to an I/O processor (or Blue Gene/L link chip) in the I/O node 170 located on a node board 120 that handles communication from the service node 160 to a number of nodes. The Blue Gene/L system has one or more I/O nodes 170 connected to the node board 120. The I/O processors can be configured to communicate with 8, 32 or 64 nodes. The service node is uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 communicates through the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node.

The service node includes a job scheduler 142 for allocating and scheduling work and data placement on the compute nodes. The job scheduler 142 loads a job 144 from data storage 138 for placement on the compute nodes. The job 144 includes information about the job executable code that includes a priority attribute 146 and other resource attributes 148. The job scheduler 142, the priority attribute 146 and the other resource attributes 148 are described more fully below.

Figure 2:
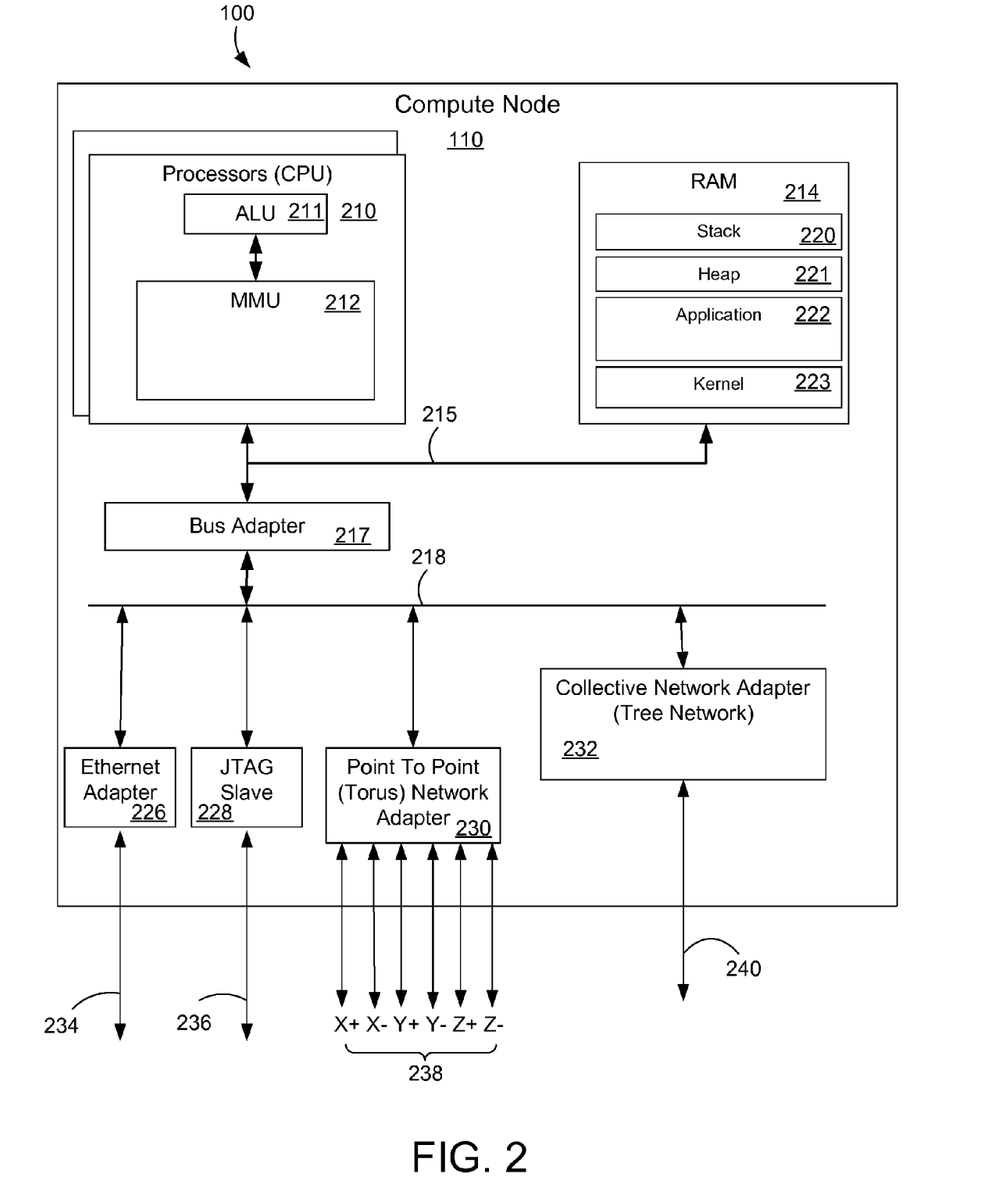
FIG. 2 is a block diagram of a compute node in a massively parallel computer system.

FIG. 2 illustrates a block diagram of an exemplary compute node as introduced above. FIG. 2 also represents a block diagram for an I/O node, which has the same overall structure as the compute node. A notable difference between the compute node and the I/O nodes is that the Ethernet adapter 226 is connected to the control system on the I/O node but is not used in the compute node. The compute node 110 of FIG. 2 includes a plurality of computer processors 210, each with an arithmetic logic unit (ALU) 211 and a memory management unit (MMU) 212. The processors 210 are connected to random access memory ('RAM') 214 through a high-speed memory bus 215. Also connected to the high-speed memory bus 214 is a bus adapter 217. The bus adapter 217 connects to an extension bus 218 that connects to other components of the compute node.

Stored in RAM 214 is a stack 220, a heap 221, an application program 222, an operating system kernel 223. The application program is loaded on the node by the control system to perform a user designated task. The application program typically runs in a parallel with application programs running on adjacent nodes. The operating system kernel 223 is a module of computer program instructions and routines for an application program's access to other resources of the compute node. The quantity and complexity of tasks to be performed by an operating system on a compute node in a parallel computer are typically smaller and less complex than those of an operating system on a typical stand alone computer. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX, Linux, Microsoft XP, AIX, IBM's i5/OS, and others as will occur to those of skill in the art.

The compute node 110 of FIG. 2 includes several communications adapters 226, 228, 230, 232 for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples example compute node 110 for data communications to a Gigabit Ethernet 234. In Blue Gene, this communication link is only used on I/O nodes and is not connected on the compute nodes. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network 236. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 236 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: +x, −x, +y, −y, +z, and −z. The torus network logically connects the compute nodes in a lattice like structure that allows each compute node 110 to communicate with its closest 6 neighbors.

The data communications adapters in the example of FIG. 2 include a collective network or tree network adapter 232 that couples the compute node 110 for data communications to a network 240 configured as a binary tree. This network is also sometimes referred to as the collective network. Collective network adapter 232 provides data communications through three bidirectional links: two links to children nodes and one link to a parent node (not shown). The collective network adapter 232 of each node has additional hardware to support operations on the collective network.

Figure 3:
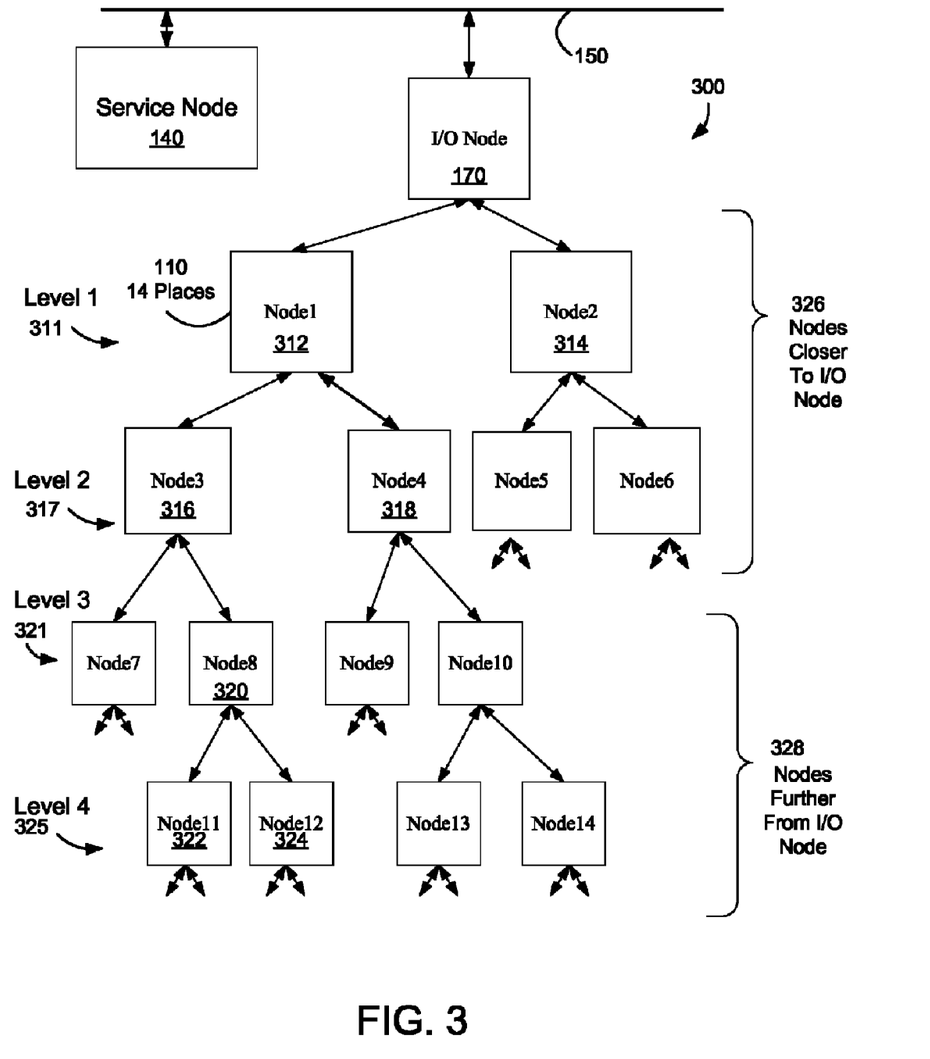
FIG. 3 shows a block diagram of a group of compute nodes to illustrate the tree network.

FIG. 3 illustrates a portion of the collective network or tree network. The collective or tree network 300 is connected to the service node 140 through the control system network 150. The tree network 300 is a group of compute nodes 110 connected an I/O node in a logical tree structure. The I/O node 170 is connected to one or more compute nodes 110. Each of the compute nodes Node1 312, and Node2 314 are connected directly to the I/O node 170 and form the top of the tree or a first level 311 for a set of nodes connected below each of Node1 312 and Node2 314. Node1 312 is the top of a tree network and has child nodes Node3 316 and Node4 318 on a second level 317. Similarly, Node8 320 on a third level 321 has child nodes Node11 322 and Node12 324 on a forth level 325. Many of the child nodes are not shown for simplicity, but the tree network 300 could contain any number of nodes with any number of levels. The nodes on the first level and the second level are indicated as nodes closer to the I/O nodes 326, while nodes on the third and higher levels are indicated as nodes further from the I/O nodes 328. Close to the I/O nodes can be defined in any suitable manner to indicate a distance smaller than the distance to node that are further away from the I/O node. In the example herein, close means within the first two levels from the I/O node, and further means more than two levels from the I/O node.

Again referring to FIG. 3, the collective network extends over the compute nodes of the entire Blue Gene machine, allowing data to be sent from any node to all others (broadcast), or a subset of nodes. Each node typically has three links, with one or two links to a child node and a third connected to a parent node. Arithmetic and logical hardware is built into the collective network to support integer reduction operations including min, max, sum, bitwise logical OR, bitwise logical AND, and bitwise logical XOR. This was an important design element, since it is recognized that current applications spend an increasing percentage of their time performing collective operations, such as global summation. The collective network is also used for global broadcast of data, rather than transmitting it around in rings on the torus network. For one-to-all communications, this is a tremendous improvement from a software point of view over the nearest-neighbor 3D torus network.

A global floating-point sum over the entire machine can be done in approximately 10 μs by utilizing the collective network twice. Two passes are required because the global network supports only integer reduction operations. On the first pass, the maximum of all exponents is obtained; on the second pass, all of the shifted mantissas are added. The collective network partitions in a manner akin to the torus network. When a user partition is formed, an independent collective network is formed for the partition; it includes all nodes in the partition (and no nodes in any other partition).

The routing of the collective network is static but general in that each node contains a static class routing table that is used in conjunction with a small header field in each packet of data sent over the network to determine a class. The class is used to locally determine the routing of the packet. With this technique, multiple independent collective networks can be virtualized in a single physical network. Two standard examples of this are the class that connects a small group of compute nodes to an I/O node and a class that includes all the compute nodes in the system. In addition, the hardware supports two virtual channels in the collective network, allowing for non-blocking operations between two independent communications.

Figure 4:
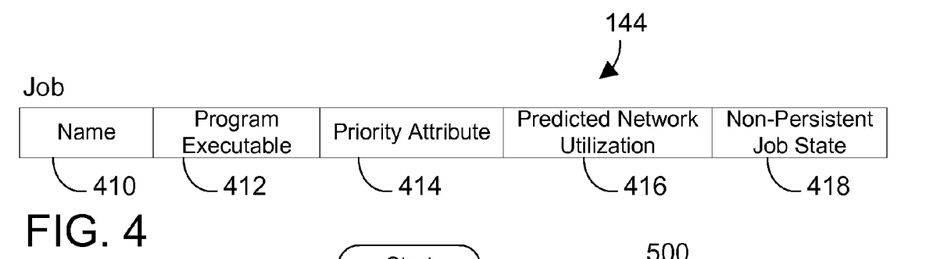
FIG. 4 represents a block diagram of a job to be loaded on the compute nodes in a parallel computer system.

FIG. 4 shows more details of a job 144 introduced above. Each job 144 has a job name 410, a program executable 412 that is the application program to be executed on a compute node. In addition, a job 144 may have some additional attributes to assist the job scheduler (142 FIG. 1) to determine which jobs are critical to efficiently allocate the job on the compute nodes in the computer system. The job 144 includes a priority attribute 414 that indicates a relative priority of the job. The priority attribute may be assigned by a system administrator. The priority attribute indicates the importance of the job. Critical jobs are those that perform critical tasks. Critical jobs are thus more important and are given a higher priority for execution and safety. A job may also be a data block similarly allocated as described herein.

As introduced in FIG. 1, other resource attributes 148 (FIG. 1) may be used by the job scheduler to allocate critical jobs on the compute nodes. These other resource attributes may include a predicted network utilization of the job 416 and a status of non-constant data job state 418. The predicted network utilization indicates a relative factor on how much the job is expected to utilize the network of the I/O node. Jobs that drive high network utilization can benefit from running near the I/O node due to less latency and fewer points of failure. The predicted network utilization 416 may be updated with actual results of the job to predict future network utilization as described further below. Class route information on the node may be used to help predict network utilization of a job on the physical network for a node in a logical network that is determined by the class route information. In a parallel program, where multiple nodes are running the same program, but each is working on different data, the network utilization may also consider the I/O and message passing requirements of each node will depend on the location of the data that it is working on.

The data state of a job may also be used by the job scheduler to allocate jobs on the compute nodes. Jobs that have a constant data state can run further from the I/O node. Jobs that have a constant data state are jobs where the data does not change or changes very little. Jobs with a constant data state are not as affected by hardware failures since they can easily be re-started on another node. An example of this is read-only data in a database. A database application serving read-only data could easily be restarted on a different node. Since the data does not change, the data as originally placed on the node is available in the data storage. In contrast, jobs that have a dynamic or non-constant data state are better suited to be placed in nodes close to an I/O node. In the event of a network failure, it is desirable to save the state of the dynamic data state. A node that is further down the tree from the I/O node means there are more network links and nodes that must be traversed to save the data state. Nodes closer to the I/O node are less likely to be restricted from a node failure that would restrict access to nodes further from an I/O node. Thus jobs with a non-constant or dynamic state are preferably allocated to a node close to an I/O node.

The job scheduler can also place data into nodes in the computer system in a similar manner. For example, where tables (row/columns) of data are divided up amongst the nodes, tables frequently accessed are loaded on compute nodes near the I/O node. This is particularly beneficial where the tables are being accessed from the service node.

Figure 5:
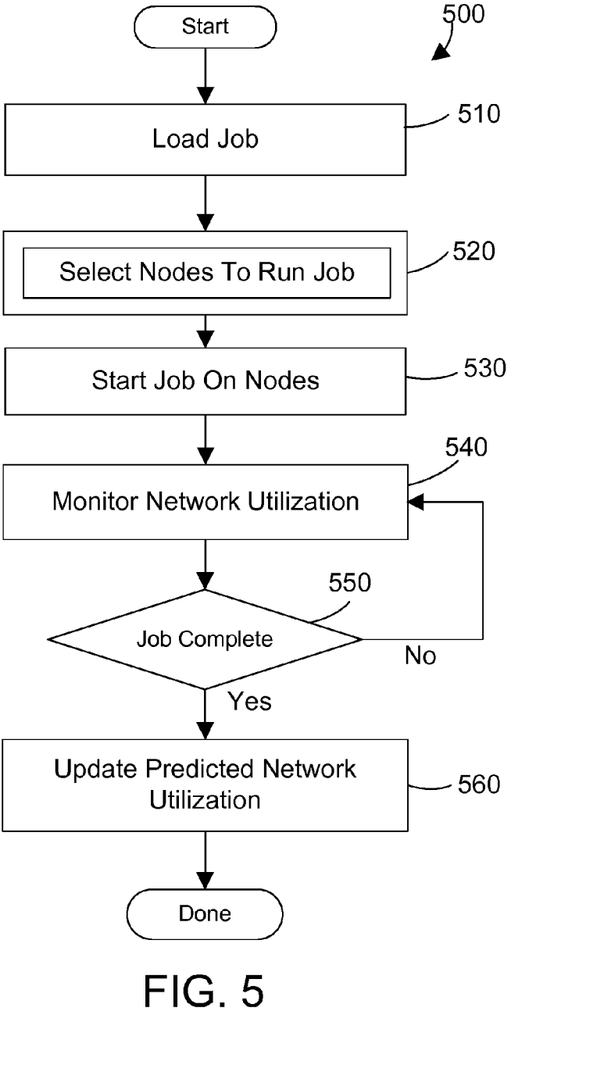
FIG. 5 is a flow diagram of a method for job and data allocation on a massively parallel computer system.

FIG. 5 shows a method 500 for allocating jobs and data to the compute nodes of a parallel computer system. The steps in method 500 are performed by a resource manager such as the job scheduler 142 in the service node 140 (FIG. 1). First, the job scheduler 142 loads a first job 144 from the data storage 138 (step 510). Next, select the nodes to run the job based on the priority attribute and the resource attributes in the job (step 520). Then start the job on the selected nodes (step 530). Next, monitor the network utilization of the job (step 540). If the job is not complete (step 550=no) then continue to monitor the job (step 540). If the job is complete (step 550=yes) then update the predicted network utilization with actual data (step 560). The method is then done.

Figure 6:
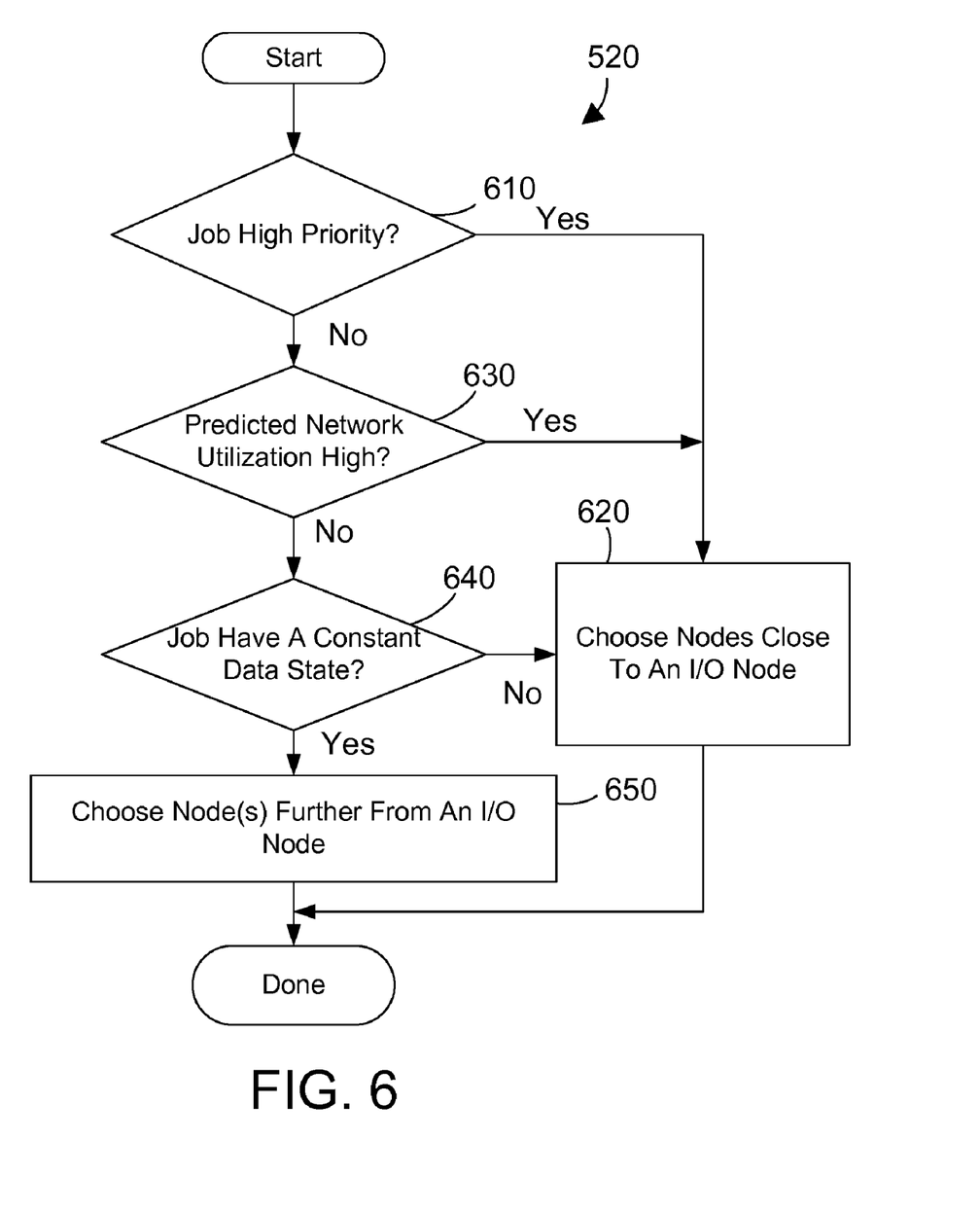
FIG. 6 is a method flow diagram that illustrates one possible implementation of step 520 in FIG. 5.

FIG. 6 shows a method 600 for selecting the nodes to execute a job on a parallel computer system as an exemplary implementation of step 520 in method 500. The method first determines if the job is a high priority job as indicated by the priority attribute associated with the job (step 610). If the job is a high priority job (step 610=yes) then choose nodes close to an I/O node (step 620). The method is then done. If the job is not a high priority job (step 610=no) then check the predicted network utilization associated with the job (step 630). If the predicted network utilization associated with the job is high (step 630=yes) then choose nodes close to an I/O node (step 620), and the method is then done. If the predicted network utilization associated with the job is not high (step 630=no) then determine if the job has a constant data state (step 640=yes). If the job has a constant data state (step 640=yes) then choose nodes further from an I/O node (step 650). If the job does not have a constant data state (step 640=no) then choose nodes close to an I/O node (step 620). The method is then done.

An apparatus and method is described herein to optimize job allocation on multiple nodes of a parallel computer such as the Blue Gene massively parallel computer systems. A job scheduler distributes jobs and data to compute nodes according to priority and other resource attributes to ensure the most critical work is done on the nodes that are quickest to access and with less possibility of node communication failure to increase the efficiency of the parallel computer system.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

What is claimed is:

1. A parallel computer system comprising:
a plurality of compute nodes that each comprises a processor and memory, wherein the plurality of compute nodes are arranged in a tree network connected to a root node, wherein the root node is an I/O node;
   a service node connected to the I/O node to allow the plurality of compute nodes to communicate with the service node wherein compute nodes on a first and second level from the I/O node are considered nodes close to the I/O node and compute nodes on other levels are considered nodes further away from the I/O node, wherein the nodes close to the I/O node are determined by a static class routing table stored in each node on the first and second levels;
   a job scheduler executing on the service node, wherein the job scheduler distributes jobs to the plurality of compute nodes and selectively places a job on a node of the plurality of compute nodes based on a priority attribute of the job and at least one resource attribute of the job, wherein the priority attribute and the at least one resource attribute are stored with the job,
   wherein the job scheduler places a job with a high priority attribute on a node of the plurality of compute nodes close to the I/O node, and
   wherein the at least one resource attribute of the job is a constant data state, and wherein the job scheduler places a job with a constant data state attribute on a node of the plurality of compute nodes further away from the I/O node.

2. The parallel computer system of claim 1 wherein the parallel computer system is a massively parallel computer system.

3. The parallel computer system of claim 1 wherein the job with the constant data state resource attribute is a job that serves read only data from a database.

4. The parallel computer system of claim 1 wherein the at least one resource attributes is network utilization.

5. The parallel computer system of claim 4 wherein the network utilization resource attribute is a predicted utilization based on past network utilization of jobs executing on the system.

6. The parallel computer system of claim 1 wherein the priority attribute is determined by a system administrator.

7. A computer implemented method for a job scheduler executing on a service node to distribute jobs and data to a plurality of compute nodes in a parallel computer system wherein the plurality of compute nodes are arranged in a tree network to a root node, wherein the root node is an I/O node; the service node connected to the I/O node to allow the plurality of compute nodes to communicate with the service node wherein compute nodes on a first and second level from the I/O node are considered nodes close to the I/O node and compute nodes on other levels are considered nodes further away from the I/O node, wherein the nodes close to the I/O node are determined by a static class routing table stored in each nodes on the first and second level, the method comprising the steps of:
   loading a job, wherein the job includes a priority attribute of the job and at least one resource attribute of the job, wherein the priority attribute and the at least one resource attribute are stored with the job;
   selecting a compute node from the plurality of compute nodes that is close to the I/O node to run the job when the job has a high priority according to the priority attribute of the job; and
   selecting a compute node from the plurality of compute nodes that is further away from the I/O node to run the job when the job has a constant data state according to the at least one resource attribute of the job.

8. The computer implemented method of claim 7 wherein the job scheduler selects a compute node from the plurality of compute nodes that is close to the I/O node to run the job when a predicted network utilization is high.

9. The computer implemented method of claim 8 further comprising the steps of:
   starting the job on the node;
   monitoring a network utilization of the job; and
   updating the predicted network utilization.

10. The computer implemented method of claim 7 wherein the job scheduler uses the at least one resource attributes to determine how to distribute jobs, and wherein the resource attributes include the following: network utilization, constant data state, and class route information on the network.

11. The computer implemented method of claim 7 wherein the priority attribute is determined by a system administrator.

12. A computer program product comprising a non-transitory computer-readable storage medium with an executable program stored thereon, wherein the executable program when executed by a processor performs a method for a job scheduler executing on a service node to distribute jobs and data to a plurality of compute nodes in a parallel computer system wherein the plurality of compute nodes are arranged in a tree network to a root node, wherein the root node is an I/O node; the service node connected to the I/O node to allow the plurality of compute nodes to communicate with the service node wherein compute nodes on a first and second level from the I/O node are considered nodes close to the I/O node and compute nodes on other levels are considered nodes further away from the I/O node, wherein the nodes close to the I/O node are determined by a static class routing table stored in each nodes on the first and second level, the method comprising the steps of:

loading a job, wherein the job includes a priority attribute of the job and at least one resource attribute of the job, wherein the priority attribute and the at least one resource attribute are stored with the job;
selecting a compute node from the plurality of compute nodes that is close to the I/O node to run the job when the job has a high priority according to the priority attribute of the job; and
selecting a compute node from the plurality of compute nodes that is further away from the I/O node to run the job when the job has a constant data state according to the at least one resource attribute of the job.

13. The computer program product of claim 12 wherein the job includes data to be placed on the node.

14. The computer program product of claim 12 wherein the priority attribute is determined by a system administrator.

15. The computer program product of claim 12 wherein the at least one resource attributes is network utilization.

16. The computer program product of claim 12 wherein the job with the constant data state is a job that serves read only data from a database.

* * * * *